United States Patent
Motyka et al.

(10) Patent No.: US 6,400,714 B1
(45) Date of Patent: Jun. 4, 2002

(54) METHOD AND APPARATUS FOR DYNAMIC TIME SLOT ASSIGNMENT

(75) Inventors: Scott D. Motyka, Newton; Kenneth C. Seiter, Whippany, both of NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/209,451

(22) Filed: Dec. 11, 1998

(51) Int. Cl.$^7$ ............................................. H04L 5/22
(52) U.S. Cl. ...................... 370/376; 370/458; 370/413
(58) Field of Search ................................. 370/341, 352, 370/359, 375, 376, 413, 419, 458

(56) References Cited

U.S. PATENT DOCUMENTS

| | | |
|---|---|---|
| 5,014,268 A | 5/1991 | Tyrrell et al. |
| 5,115,428 A * | 5/1992 | Ramanan et al. ........... 370/352 |
| 5,335,228 A | 8/1994 | Bottiglieri et al. |
| 5,412,657 A | 5/1995 | Bottiglieri et al. |
| 5,490,150 A | 2/1996 | Andrews et al. |
| 5,521,928 A | 5/1996 | Worsley et al. |
| 5,953,330 A * | 9/1999 | Canniff et al. .............. 370/352 |
| 6,002,502 A * | 12/1999 | Pomp et al. ................. 359/117 |

* cited by examiner

Primary Examiner—Hassan Kizou
Assistant Examiner—Tim Spafford
(74) Attorney, Agent, or Firm—Dickstein, Shapiro, Morin & Oshinsky LLP

(57) ABSTRACT

A three stage method and apparatus for performing dynamic time slot assignment on both 2-bit and 8-bit information is disclosed. In the first stage, 2-bit packets undergo a 2-bit time slot assignment prior to being sent to a conventional time slot interchanger. 8-bit information, however, is passed to the time slot interchanger without undergoing the 2-bit time slot assignment. The time slot interchanger performs time slot assignment on the 8-bit information to place the information in the appropriate outgoing DS0 time slots. In the second stage, the time slot interchanger places the 2-bit information into a fixed sequence of 8-bit time slots and passes these time slots to a packer. The prescribed time slots are established such that each time slot represents an assigned 2-bit location within a specific 8-bit time slot. The packer then combines the assigned time slots to create a serial stream of 8-bit time slots where each time slot contains up to four dynamically assigned 2-bit packets. In the third stage, the packed streams are routed back through the time slot interchanger for dynamic time slot assignment to place the information in the appropriate outgoing DS0 time slots. Accordingly, the method performs dynamic time slot assignment without additional time slot interchangers and unnecessary delays.

26 Claims, 3 Drawing Sheets

METHOD AND APPARATUS FOR DYNAMIC TIME SLOT ASSIGNMENT

BACKGROUND OF THE INVENTION

1. Field of the Invention

The present invention relates to the field of time slot interchangers for telecommunication transmission systems and, more particularly to an improved method and apparatus for dynamic time slot assignment.

2. Description of the Related Art

Digital loop carrier transmission systems, such as the Subscriber Loop Carrier (SLC®) transmission system by Lucent Technologies, rely on time slot interchangers (TSIs) to place digital information in appropriate time slots for transmission between customers and a local digital switch (known in the art as time slot assignment). Typically, these time slot interchangers have a resolution of 8-bits since most networks are based on 8-bit packets of information (an 8-bit packet will also be referred to herein as a "DS0 packet").

The development of the Integrated Services Digital Network (ISDN) services allows voice, digital network services and video to be transmitted over a single wire or optical fiber in an effort to replace the current plain old telephone system (POTS) services. It is desirable to transmit the ISDN information on existing digital loop carrier systems. The ISDN information includes two channels, B1 and B2, each containing 8-bit packets of information. The ISDN information, however, also includes a D-channel which consists of 2-bit packets of information. Therefore, the standard time slot interchanger and time slot assignment methods which are based on 8-bit packets must be altered to properly handle the 2-bit packets of the ISDN D-channel.

Previous methods have used an entire DS0 packet for the 2-bit D channel data. These methods waste precious bandwidth every time D channel information is being transmitted since the DS0 packet is ¾ empty. Other methods have rerouted DS0 packets containing solely D channel information multiple times through an 8-bit time slot interchanger. These methods use a 2-bit shifter to properly shift the 2-bits of information into a DS0 packet comprised of four sets of D channel data. These methods, however add a full frame of delay to the transmitted information.

Other methods oversample the information being input into the time slot interchanger. In these methods, the TSI is run at a rate that is four times the rate of the information being input into the TSI. Four time slots are subsequently combined to form one DS0. Since the oversampling is performed for all input information, even the 8-bit data, these methods cause the entire TSI to operate at ¼ its capacity and thus, would require other TSIs to avoid wasting bandwidth and to properly perform time slot assignment for 8-bit packet data. The additional TSIs add cost and processing overhead. Accordingly, there is a desire and need for a dynamic time slot assignment method and apparatus capable of handling 2-bit and 8-bit packets of information inexpensively, efficiently and using conventional time slot interchangers.

SUMMARY OF THE INVENTION

The present invention provides a dynamic time slot assignment method and apparatus capable of handling 2-bit and 8-bit packets of information inexpensively, efficiently and using conventional time slot interchangers.

The above and other features and advantages of the invention are achieved by providing a three stage method and apparatus for performing dynamic time slot assignment on both 2-bit and 8-bit information. In the first stage, 2-bit packets undergo a 2-bit time slot assignment prior to being sent to a conventional time slot interchanger. 8-bit information, however, is passed to the time slot interchanger without undergoing the 2-bit time slot assignment. The time slot interchanger performs time slot assignment on the 8-bit information to place the information in the appropriate outgoing DS0 time slots. In the second stage, the time slot interchanger places the 2-bit information into a fixed sequence of 8-bit time slots and passes these time slots to a packer. The prescribed time slots are established such that each time slot represents an assigned 2-bit location within a specific 8-bit time slot. The packer then combines the assigned time slots to create a serial stream of 8-bit time slots where each time slot contains up to four dynamically assigned 2-bit packets. In the third stage, the packed streams are routed back through the time slot interchanger for dynamic time slot assignment to place the information in the appropriate outgoing DS0 time slots. Accordingly, the method performs dynamic time slot assignment without additional time slot interchangers and unnecessary delays.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

Figure 3:
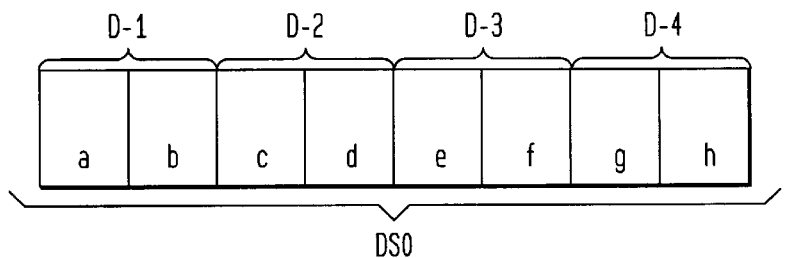
FIG. 3 illustrates the alignment of 2-bit data (di-bits) in an 8-bit packet.

Prior to discussing the present invention, a brief description of the 8-bit DS0 packet of a DS0 channel is provided. Referring to FIG. 3, it can be seen that a DS0 packet includes eight bits a, b, c, d, e, f, g, h of information. The eight bits a, b, c, d, e, f, g, h are organized into four 2-bit entities known in the art as di-bits D-1, D-2, D-3, D-4. The first di-bit D-1 includes bit a and b, the second di-bit D-2 includes bits c and d, the third di-bit D-3 includes bits e and g and the fourth di-bit D-4 includes bits g and h.

Figure 1:
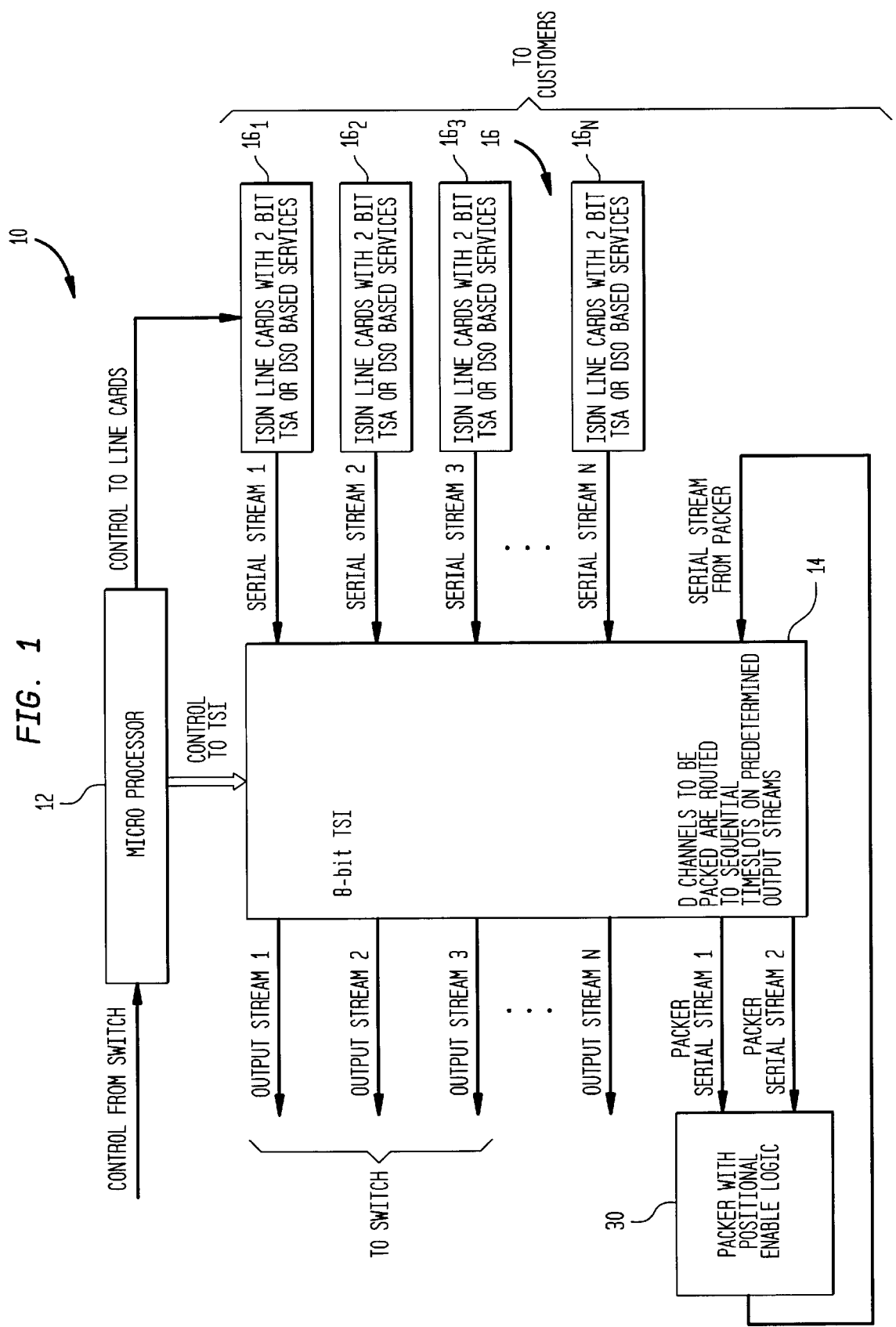
FIG. 1 illustrates a block diagram of an apparatus for performing dynamic time slot assignment on both 2-bit and 8-bit information constructed in accordance with the present invention.

FIG. 1 illustrates an apparatus 10 for performing dynamic time slot assignment on both 2-bit and 8-bit information constructed in accordance with the present invention. The apparatus 10 includes a microprocessor 12, an 8-bit time slot interchanger (TSI) 14, a packer circuit 30 and a set of ISDN line card circuits $16_1, 16_2, 16_3 \ldots 16_n$ (collectively referred to herein as "line cards 16"). As stated earlier, the apparatus 10 would be incorporated into a digital loop carrier system to perform dynamic time slot assignment on both 2-bit and 8-bit information.

Each line card 16 interfaces with customer equipment and outputs a serial stream of digitized data to the TSI 14. The line cards 16 will be configured by the microprocessor to perform a 2-bit time slot assignment on any D channel information the line cards 16 receive. That is, the line cards 16 will be configured to place the D channel information into a specific di-bit of a DS0 packet. This can be accomplished by one of two methods. First, the line cards 16 can place the D channel data into the correct di-bit while leaving the remaining three di-bits of the DS0 packet empty. In the alternative, the line cards 16 can place the D channel information into every di-bit of the DS0 packet (that is, instead of being ¾ empty, the DS0 packet will have the same D channel information in every di-bit). Either method will suffice since the TSI 14 will be configured by the microprocessor 12 to identify the appropriate di-bit and place the information in the appropriate time slot towards the packer 30. Thus, the remaining three di-bits of the DS0 packet are of no consequence to the apparatus 10. It must be noted that the line cards 16 will not perform time slot assignment on 8-bit information. DS0s on the serial streams from the line cards 16 are in fixed positions. The output serial stream from each line card 16 will contain either a DS0 packet with D channel information in the correct di-bit or a DS0 packet with 8-bit information.

The serial streams output by the line cards 16 are input into the TSI 14. It must be noted that the number of serial streams that the TSI 14 can input (i.e., the size of the TSI 14) will vary depending upon the application. Typical sizes for the TSI 14 are 256, 512, 1024, 2048 and 4096 input and output channels or DS0s. The TSI 14 may be any conventional TSI and is configured by the microprocessor 12 to perform 8-bit time slot assignment on the serial streams comprised of DS0 packets with 8-bit data. Time slot assignment takes place by interchanging DS0s between those assigned from the local digital switch and those providing service on the digital loop carrier utilizing the TSI 14 with the present invention.

Figure 4:
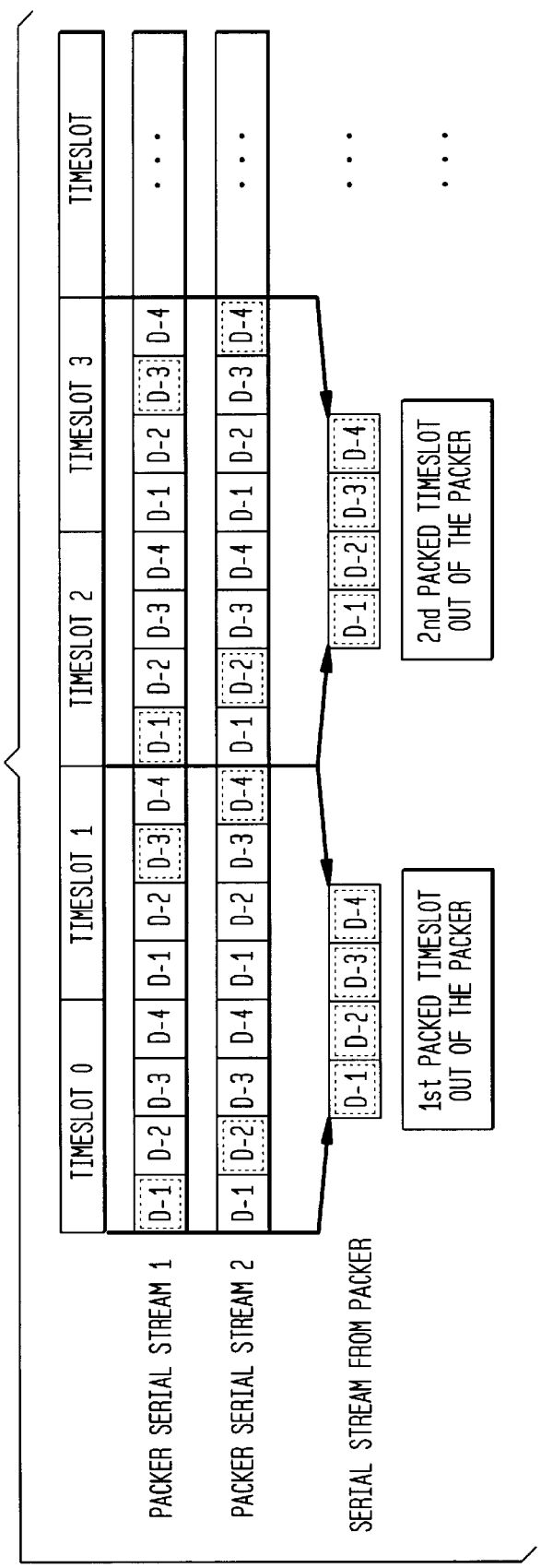
FIG. 4 illustrates the packing of di-bits in accordance with the present invention.

A portion of the TSI 14 is also configured to route the DS0s with D channel information to the packer circuit 30. The TSI 14 arranges four DS0s (each with only one di-bit containing D channel information) into a fixed sequence of DS0 time slots. The arranged DS0s are then sent to the packer 30 input serial stream(s). That is, the TSI 14 takes four separate DS0s (from any of the input serial streams) and orders them into a fixed sequence of time slots destined for the packer 30 input stream(s). The arrangement is controlled by a fixed mapping algorithm in which the microprocessor 12 dictates which di-bits from which serial streams are to be routed together (and subsequently packed together by the packer circuit 30). For example, the TSI 14 may be configured to sequentially place DS0s from input serial streams 1, 3, 6 and 9 together for one packer stream. FIG. 4 illustrates two packer serial streams that were created by the TSI 14. Note that each stream has a series of time slots and that each time slot has only one di-bit (illustrated in FIG. 4 as a circled di-bit) that needs to be packed by the packer circuit 30. As will be described below, the packer circuit 30 takes the di-bits from the DS0 time slots and creates a DS0 comprising four di-bits of information. FIG. 1 illustrates the two packer serial streams exiting the TSI 14. The packer 30 may be configured to support from one to four serial streams. The number of serial streams required equals the number of ISDN customers the system supports, divided by the number of DS0s in a serial stream. In this system, for example, each serial stream contains 128 DS0s, thus this packer adaptation using two serial streams can support 256 ISDN D channels.

Figure 5:
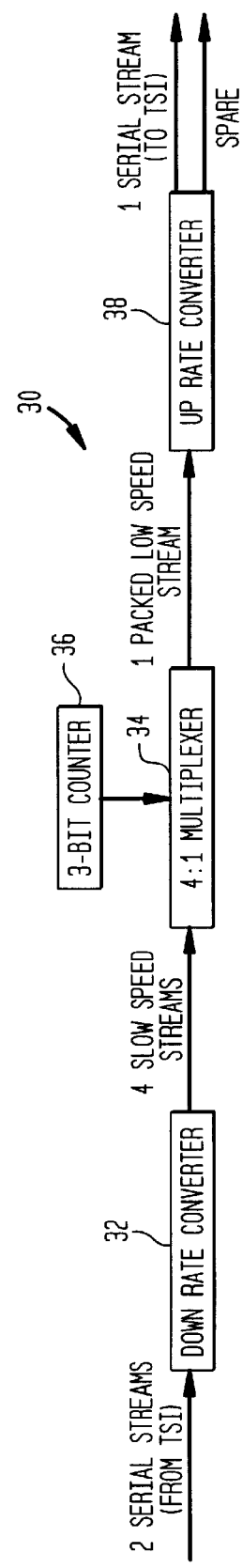
FIG. 5 illustrates an exemplary packer circuit used in the apparatus illustrated in FIG. 1.

The packer circuit 30 is connected to and receives the packer streams from the TSI 14. As stated above, there can be anywhere from one to four packer serial streams. FIG. 5 illustrates an exemplary packer circuit 30 used in the present invention. The packer circuit 30 includes two rate converters 32, 38, a 4:1 multiplexer 34 and a counter 36. The first converter 32 receives the two packer serial streams from the TSI 14 and down rate converts the streams into four low speed streams. The four low speed streams are fed into the multiplexer 34 which is controlled by the counter 36 to properly output the different di-bits onto the output of the multiplexer 34. The multiplexer 34 output is then up rate converted by the second converter 38 and fed to the TSI 14 over a high speed stream. As illustrated in FIG. 4, the packer circuit 30 takes specific di-bits out of the packer serial streams and places them into one DS0. The DS0 created by the packer circuit 30 contains four di-bits of information. FIG. 4 illustrates how two packer streams were used to create the first two packed DS0 time slots. Once packed, the DS0s are routed to the TSI 14 in a serial stream. The TSI 14 performs 8-bit time slot assignment on the serial streams received from the packer circuit 30 since they contain DS0s with 8-bit data. The time slot assignment places the DS0 into the appropriate DS0 time slot and then the TSI 14 outputs the information to the switch.

FIG. 1 illustrates the use of the apparatus 10 for transmission going upstream or towards a local digital switch of the digital loop carrier, but it must be noted that the apparatus is also used for transmissions going downstream or towards the customers.

Figure 2:
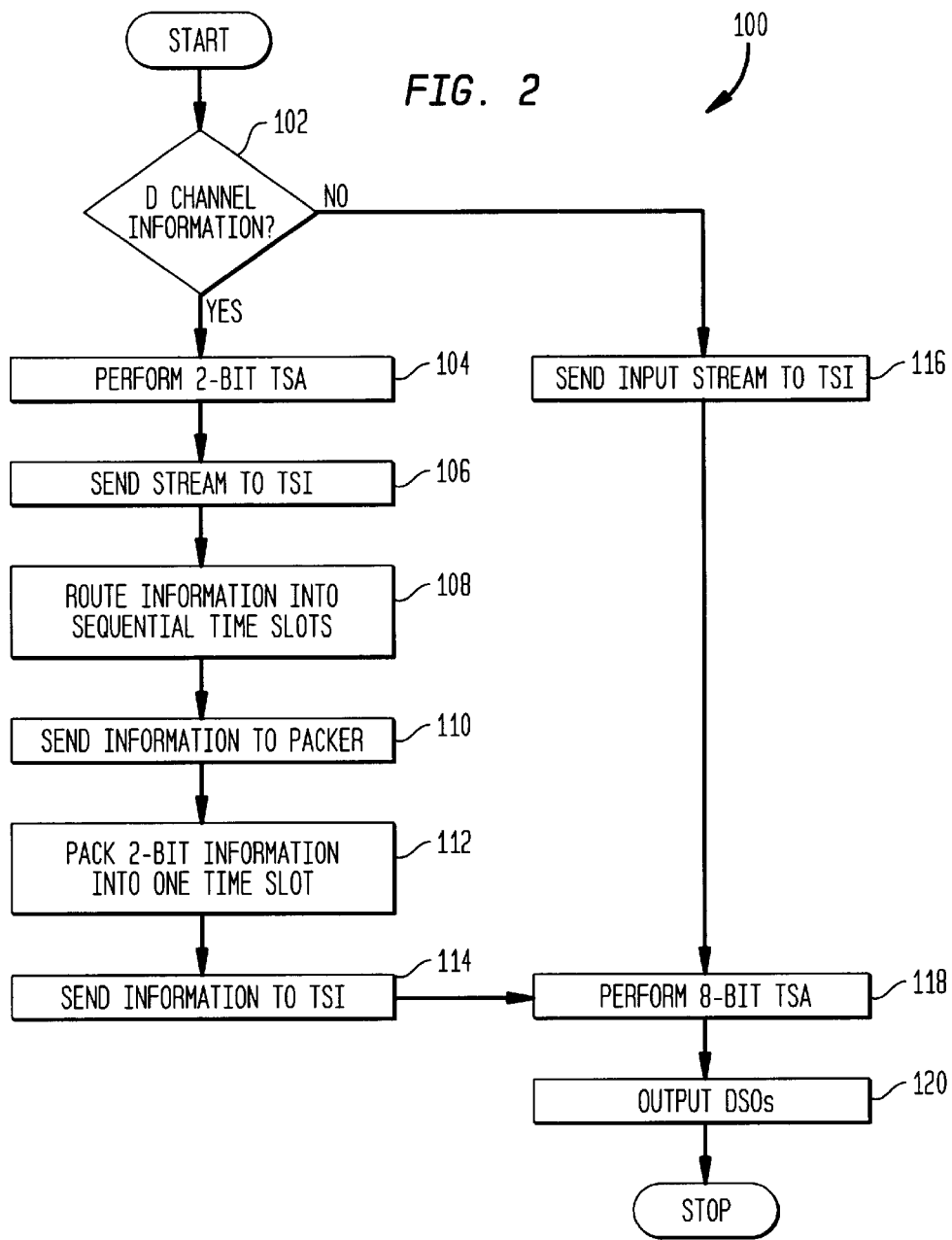
FIG. 2 illustrates a method of performing dynamic time slot assignment on both 2-bit and 8-bit information constructed in accordance with the present invention.

FIG. 2 illustrates a method 100 of performing dynamic time slot assignment on both 2-bit and 8-bit information constructed in accordance with the present invention. Initially, it is determined by the type of line cards whether D channel information is being transmitted (step 102). If there is D channel information being transmitted, the method 100 proceeds to step 104 where the line cards perform a 2-bit time slot assignment (TSA) on the D channel information. As stated earlier, the 2-bit TSA can be performed by placing the D channel information into its appropriate di-bit or by placing the D channel information into all of the di-bits within the DS0. In step 106, the line cards send a serial stream containing DS0s with D channel information to the time slot interchanger (TSI).

The TSI arranges four DS0s (each with only one di-bit containing D channel information) into sequential DS0 time slots (step 108). The arranged DS0s are then sent to the packer circuit in a packer serial stream (step 110). As stated earlier, the TSI can be configured to output one to four packer serial streams depending upon the application. In step 112, the packer circuit extracts specific dibits out of the packer serial streams and places them into one DS0. The DS0 created by the packer circuit contains four di-bits of information. Once packed, the DS0s created by the packer circuit are routed to the TSI (step 114). The TSI performs 8-bit TSA on the serial streams received from the packer (step 118). In step 120, the TSI outputs the information to the switch.

If D channel information is not being transmitted, the method 100 proceeds to step 116 where the line cards output the input serial streams to the TSI since there is no need to perform 2-bit TSA on the input information. The TSI performs 8-bit TSA on the serial streams received from the line cards (step 118). In step 120, the TSI outputs the information to the switch.

It should be appreciated that while the present invention has been described in terms of interchanging 2-bit packets using a time slot interchanger with 8-bit resolution, it is not to be so limited. Rather, the present invention is applicable wherever a time slot interchanger with n-bit resolution is used to process m-bit wide information, where m is some fraction of n.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of performing dynamic time slot assignment on input packets containing either n-bits or m-bits of information, where n is an integer and m is some fraction of n, said method comprising:

performing m-bit time slot assignment on input packets containing m-bit information;

ordering said time slot assigned m-bit information into sequential time slots;

packing said sequentially ordered time slot assigned m-bit information into n-bit packets sequenced according to a predetermined order of the m-bit packet inputs; and performing n-bit time slot assignment on said n-bit packets resulting from said packing step, said n-bit time slot assignment step and said ordering step being performed by a same time slot interchanger circuit.

2. The method of claim 1 further comprising the step of performing n-bit time slot assignment on input packets containing n-bits of information.

3. The method of claim 1 wherein the step of performing m-bit time slot assignment on input packets containing m-bit information comprises placing the m-bit information into all m-bit locations of an n-bit packet.

4. The method of claim 1 wherein the step of performing m-bit time slot assignment on input packets containing m-bit information comprises placing the m-bit information into an appropriate m-bit location of an n-bit packet.

5. The method of claim 1 wherein n is 8 and m is 2.

6. The method of claim 1 wherein the step of packing said sequentially ordered time slot assigned m-bit information into n-bit packets comprises the steps of:

extracting a plurality of m-bit information from a plurality of sequentially ordered time slots; and placing the extracted plurality of m-bit information into appropriate m-bit locations of n-bit packets.

7. A circuit for performing dynamic time slot assignment on input packets containing either n-bits or m-bits of information, where n is an integer and m is some fraction of n, said circuit comprising:

a time slot interchanger circuit with n-bit resolution, said time slot interchanger receiving time slot assigned m-bit information, said time slot interchanger ordering said time slot assigned m-bit information into sequential time slots, said time slot interchanger having a plurality of outputs; and a packing circuit connected to at least one output of said time slot interchanger, said packing circuit packing said sequentially ordered time slot assigned m-bit information received from said time slot interchanger into n-bit packets and outputting said packed n-bit packets to said time slot interchanger, wherein said time slot interchanger circuit performs n-bit time slot assignment on said n-bit packets output from said packing circuit.

8. The circuit of claim 7 further comprising a plurality of line card circuits, each of said circuits receiving input packets and being configured to perform m-bit time slot assignment on input packets comprising m-bit information, each of said circuits having an output connected to said time slot interchanger comprising either time slot assigned m-bit information or n-bit information.

9. The circuit of claim 8 wherein said line card circuits are Integrated Services Digital Network line card circuits.

10. The circuit of claim 8 wherein said line card circuits performs m-bit time slot assignment on input packets containing m-bit information by placing the m-bit information into all m-bit locations of an n-bit packet.

11. The circuit of claim 8 wherein said line card circuits performs m-bit time slot assignment on input packets containing m-bit information by placing the m-bit information into an appropriate m-bit location of an n-bit packet.

12. The circuit of claim 8 wherein n is 8 and m is 2.

13. A circuit for performing dynamic time slot assignment on input packets containing either n-bits or m-bits of information, where n is an integer and m is some fraction of n, said circuit comprising:

a time slot interchanger circuit with n-bit resolution, said time slot interchanger receiving time slot assigned m-bit information, said time slot interchanger ordering said time slot assigned m-bit information into sequential time slots, said time slot interchanger having a plurality of outputs, and a packing circuit connected to at least one output of said time slot interchanger, said packing circuit packing said sequentially ordered time slot assigned m-bit information received from said time slot interchanger into n-bit packets and outputting said packed n-bit packets to said time slot interchanger, said packing circuit comprising:

a first converter receiving said at least one output of said time slot interchanger and outputting a plurality of streams containing m-bit information; and a multiplexer receiving said plurality of streams, said multiplexer being controlled to output said m-bit information in a particular order.

14. The circuit of claim 13 wherein said packing circuit further comprises a second converter receiving the output of said multiplexer, said second converter having an output connected to said time slot interchanger.

15. The circuit of claim 7 wherein said time slot interchanger receives n-bit information and performs n-bit time slot assignment on said n-bit information.

16. The circuit of claim 15 wherein said time slot interchanger outputs said n-bit time slot assigned information to a digital switch of a telecommunications system.

17. A telecommunications system comprising:

a microprocessor for controlling said telecommunication system; and a circuit under control of said microprocessor for performing dynamic time slot assignment on input packets containing either n-bits or m-bits of information, where n is an integer and m is some fraction of n, said circuit comprising:

a time slot interchanger circuit with n-bit resolution, said time slot interchanger receiving time slot assigned m-bit information, said time slot interchanger ordering said time slot assigned m-bit information into sequential time slots, said time slot interchanger having a plurality of outputs; and a packing circuit connected to at least one output of said time slot interchanger, said packing circuit packing said sequentially ordered time slot assigned m-bit information received from said time slot interchanger into n-bit packets and outputting said packed n-bit packets to said time slot interchanger, wherein said time slot interchanger circuit performs n-bit time slot assignment on said n-bit packets output from said packing circuit.

18. The system of claim 17 wherein said circuit for performing dynamic time slot assignment further comprises a plurality of line card circuits, each of said circuits receiving input packets and being configured to perform m-bit time slot assignment on input packets comprising m-bit information, each of said circuits having an output connected to said time slot interchanger and comprising either time slot assigned m-bit information or n-bit information.

19. The system of claim 18 wherein said line card circuits are Integrated Services Digital Network line card circuits.

20. The system of claim 18 wherein said line card circuits performs m-bit time slot assignment on input packets containing m-bit information by placing the m-bit information into all m-bit locations of an n-bit packet.

21. The system of claim 18 wherein said line card circuits performs m-bit time slot assignment on input packets containing m-bit information by placing the m-bit information into an appropriate m-bit location of an n-bit packet.

22. The system of claim 18 wherein n is 8 and m is 2.

23. A telecommunications system comprising:
   a microprocessor for controlling said telecommunication system; and
   a circuit under control of said microprocessor for performing dynamic time slot assignment on input packets containing either n-bits or m-bits of information, where n is an integer and m is some fraction of n, said circuit comprising:
   a time slot interchanger circuit with n-bit resolution, said time slot interchanger receiving time slot assigned m-bit information, said time slot interchanger ordering said time slot assigned m-bit information into sequential time slots, said time slot interchanger having a plurality of outputs, and
   a packing circuit connected to at least one output of said time slot interchanger, said packing circuit packing said sequentially ordered time slot assigned m-bit information received from said time slot interchanger into n-bit packets and outputting said packed n-bit packets to said time slot interchanger, wherein said packing circuit comprises:
      a first converter receiving said at least one output of said time slot interchanger and outputting a plurality of streams containing m-bit information; and
      a multiplexer receiving said plurality of streams, said multiplexer being controlled to output said m-bit information in a particular order.

24. The system of claim 23 wherein said packing circuit further comprises a second converter receiving the output of said multiplexer, said second converter having an output connected to said time slot interchanger.

25. The system of claim 17 wherein said time slot interchanger receives n-bit information and performs n-bit time slot assignment on said n-bit information.

26. The system of claim 25 wherein said time slot interchanger outputs said n-bit time slot assigned information to a digital switch of said telecommunications system.

* * * * *